Figure 1:
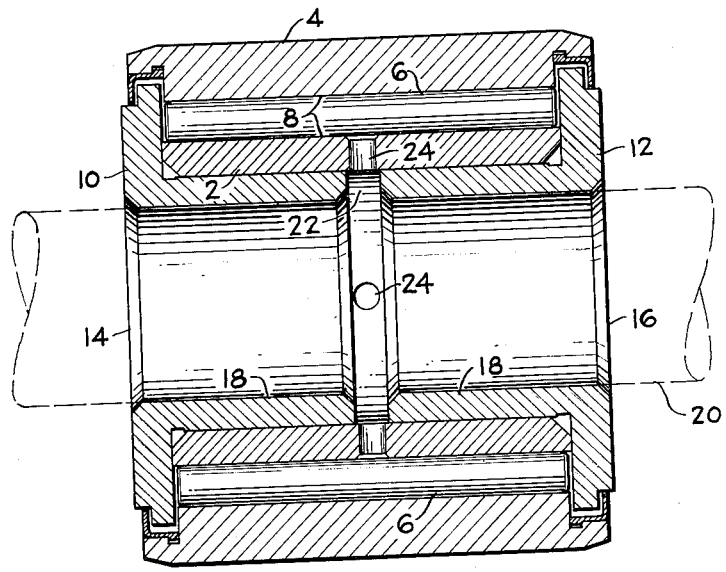

Oct. 17, 1961    V. J. POWERS    3,004,808
ROLLER BEARING ASSEMBLY
Filed Nov. 12, 1959

VINCENT J. POWERS
*INVENTOR.*

BY *Albert Sperry.*

*ATTORNEY*

United States Patent Office 3,004,808
Patented Oct. 17, 1961

---

3,004,808
ROLLER BEARING ASSEMBLY
Vincent J. Powers, South Orange, N.J., assignor to Accurate Bushing Company, Garwood, N.J., a corporation of New Jersey
Filed Nov. 12, 1959, Ser. No. 852,282
5 Claims. (Cl. 308—212)

This invention relates to roller bearing assemblies and is directed particularly to constructions which are economical to produce and which do not seize or become frozen onto a shaft or other member to which they are applied.

It is usual practice to provide roller bearing assemblies with inner and outer race rings one of which has an end ring or thrust ring secured thereto. The end ring is frequently secured to the race ring by a pressed fit requiring both the race member and the end ring to be machined to close tolerances. Even then the end ring may become loose so that it is lost or displaced in use or it may have such a tight fit as to distort the race member the end ring causing the race member to "freeze" upon the shaft or member to which it is applied. In any event, the tendency for the race member to become rusted or corroded on a shaft preventing its removal for replacement or repair has given rise to specifications requiring the inner race ring to be cadmium plated or otherwise treated to permit removal of the bearing from a shaft.

In accordance with the present invention, these objections and limitations of prior art constructions are overcome and means are provided which permit the end rings of roller bearings to be formed and secured to the race members without distortion thereof or danger of freezing in place. Moreover, the end rings may be formed of metal differing from that of the race members and more suitable for use as thrust means. The invention also permits the length of the rollers to be increased whereby the capacity of a roller bearing assembly of a given size may be increased.

These advantages are preferably attained by providing the race member with opposed sleeves which embrace the race member and extend across the ends thereof to serve as end rings for the bearing assembly. These sleeves are preferably formed of non-corroding metal such as stainless steel or bronze so that they will not rust or become corroded in place on the members which they engage.

Accordingly, it is an object of the present invention to provide a novel type of roller bearing assembly wherein the end rings which receive the end thrust of the rollers are carried by sleeves which embrace one of the race members.

Another object of the invention is to provide a roller bearing assembly with a race member and a non-corroding sleeve which fits between the race member and a member to which the assembly is to be secured.

A further object of the invention is to reduce the cost of producing roller bearing assemblies.

These and other objects and features of the present invention will appear from the following description thereof wherein reference is made to the figures of the accompanying drawing.

Figure 2:
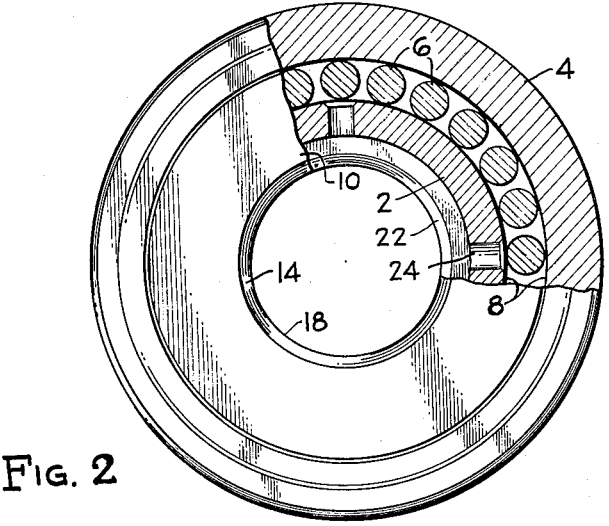

In the drawing:

FIG. 1 is a longitudinal sectional view through a typical form of roller bearing assembly embodying the present invention, and FIG. 2 is a sectional view of the assembly of FIG. 1.

In the embodiment of the invention chosen for purposes of illustration in the figures of the drawing, the assembly includes an inner race member 2, an outer race member 4 and a complement of rollers 6 located between the race members and engaging the bearing surfaces 8 thereof. The end rings 10 and 12 of the bearing assembly are in the form of radially extending flanges carried by the tubular sleeves 14 and 16 respectively and are positioned to extend outwardly adjacent the opposite ends of the bearing surface 8 of the inner race member 2.

The race members are preferably formed of hardened bearing steel which is accurately machined and ground to form the bearing surfaces 8. However, the sleeves 14 and 16 and the end rings 10 and 12 thereof are formed integrally and preferably are made of non-corrosive metal such as stainless steel. The sleeves are each fabricated or machined to provide a tubular portion 18 which fits closely against the inner surface of the inner race member 2 while also fitting snugly against the exterior surface of a shaft 20 or other member to which the assembly is to be applied. The tubular portion of the sleeve may be press fitted onto the race member or otherwise secured in place with reference thereto as desired.

In the preferred form of the invention illustrated, the length of the tubular portion of each sleeve is somewhat less than half the length of the bearing assembly so that the adjacent ends of the sleeves are spaced apart when the end rings or flanges 10 and 12 of the sleeves are in abutment with the adjacent ends of the inner race member. The space 22 between the ends of the sleeves will then serve as an oil groove which may communicate with the bearing surface 8 of the inner race ring through the oil hole 24. In this way, it is possible to eliminate the usual machining operation required to form an oil groove in the race member.

The construction thus provided is relatively inexpensive to produce since the end rings and race members require much less machining and do not have to be so accurately formed as in the usual roller bearing assembly. Moreover, the inner race member is not pressed inward or distorted adjacent its ends by any press fitting or shrinking of the end ring into place so that the race member is not caused to "freeze" on the shaft 20. Furthermore, by forming the sleeves 14 and 16 of stainless steel or similar metal, the danger of rusting or corroding of the race member on the shaft is eliminated whereby removal of the bearing assembly for replacement or repair is facilitated. If preferred, the sleeves and end rings can be formed of bronze, brass or other metal which serves to reduce friction or better serve as a thrust member engageable by the ends of the rollers 6. The sleeves may be produced from tubular material by pressing, forming or machining operations and need not be so accurately formed as required when they are to be pressed onto the inner race member.

The present invention also permits the use of rollers 6 which are equal in length to the width of the race member since the race member does not have to be cut away to form a shoulder for receiving the usual press fit end ring. As a result, the rollers may be longer than heretofore so that the capacity of the bearing is increased without increasing the length of the race members.

The operations required to produce the roller bearing assembly are thus greatly simplified and accurate machining of the various parts can be reduced to a minimum. Moreover, no expensive plating of the parts is necessary in order to permit removal of the assembly from a shaft to which it is applied. The cost and time required for producing roller bearing assemblies embodying the present invention is thereby greatly reduced.

While the construction shown in the drawing has the sleeves and end rings applied to the inner race member, it will be apparent that they may be applied equally well to the outer race member if desired. It is also possible to use the present invention in roller bearing assemblies having a cage for spacing the rollers if desired. The invention is, therefore, applicable to various types, sizes and arrangements of elements in roller bearing assemblies. In view thereof, it should be understood that the particular form of bearing assembly shown in the drawing and described above is intended to be illustrative only and is not intended to limit the scope of the invention.

What is claimed is:

1. A roller bearing assembly comprising an inner race member, an outer race member, roller bearings located between said race members and engaging the bearing surfaces thereof and a pair of tubular sleeves each of which has a flange on the end thereof, said sleeves embracing one of said race members and positioned so that the flanges thereon project radially beyond the bearing surfaces of both said race members at opposite sides thereof so as to enclose the ends of the roller bearings and serve as end rings engageable by the roller bearings and by the other race member upon relative endwise movement of either the roller bearings or the other race member.

2. A roller bearing assembly comprising an inner race member, an outer race member, roller bearings located between said race members and engaging the bearing surfaces thereof and a pair of tubular sleeves each of which has a flange on the end thereof, said sleeves embracing one of said race members and positioned so that the flanges thereon project radially beyond the bearing surfaces of both of the race members at opposite sides thereof so as to enclose the ends of the roller bearings and serve as end rings engageable by the roller bearings and by the other race member upon relative endwise movement of either the roller bearings or the other race member, the adjacent ends of the sleeves being spaced apart and co-operating to form an oil groove for the bearing, there being an oil hole extending from said oil groove through the race member to said bearing surface.

3. A roller bearing assembly comprising an inner race member, an outer race member, roller bearings between said race members and engaging the bearing surfaces thereof, a pair of tubular sleeves extending into the inner race member and bearing against the inner surface thereof, said sleeves each having a radially extending flange on the outer end thereof projecting beyond the bearing surfaces of both said race members so that said flanges are located adjacent the opposite edges of said bearing surface and not only enclose the roller bearings but also serve as end rings engageable by said roller bearings and by the outer race member upon relative endwise movement of either the roller bearings or the outer race member.

4. A roller bearing assembly comprising an inner race member, an outer race member, roller bearings between said race members and engaging the bearing surfaces thereof, a pair of tubular sleeves formed of stainless steel and extending into the inner race member and bearing against the inner surface thereof, said sleeves each having a radially extending flange on the outer end thereof projecting beyond the bearing surfaces of both said race members so that said flanges are located adjacent the opposite edges of said bearing surface and not only enclose the roller bearings but also serve as end rings engageable by said roller bearings and by the outer race member upon relative endwise movement of either the roller bearings or the outer race member.

5. A roller bearing assembly comprising an inner race member, an outer race member, roller bearings between said race members and engaging the bearing surfaces thereof, a pair of tubular sleeves formed of stainless steel and extending into the inner race member and bearing against the inner surface thereof, said sleeves each having a radially extending flange on the outer end thereof projecting beyond the bearing surfaces of both said race members so that said flanges are located adjacent the opposite edges of said bearing surface and not only enclose the roller bearings but also serve as end rings engageable by said roller bearings and by the outer race member upon relative endwise movement of either the roller bearings or the outer race member, the adjacent ends of the sleeves being spaced apart and co-operating to form an oil groove for the bearing, there being an oil hole extending from said oil groove through the race member to said bearing surface.

References Cited in the file of this patent

UNITED STATES PATENTS

| | | |
|---|---|---|
| 1,884,925 | Vanderbeek | Oct. 25, 1932 |
| 2,074,182 | Heim | Mar. 16, 1937 |
| 2,228,106 | Beria | Jan. 7, 1941 |
| 2,383,727 | Lewis | Aug. 28, 1945 |
| 2,545,327 | Williams | Mar. 13, 1951 |
| 2,711,103 | Miner | June 21, 1955 |

FOREIGN PATENTS

| | | |
|---|---|---|
| 621,301 | Great Britain | Apr. 7, 1949 |